(12) United States Patent
O'Callahan

(10) Patent No.: US 8,027,904 B2
(45) Date of Patent: *Sep. 27, 2011

(54) METHOD AND SYSTEM FOR CREATING AND TRADING CORPORATE DEBT SECURITY DERIVATIVE INVESTMENT INSTRUMENTS

(75) Inventor: Dennis M. O'Callahan, Evanston, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 736 days.

This patent is subject to a terminal disclaimer.

(21) Appl. No.: 11/409,381

(22) Filed: Apr. 21, 2006

(65) Prior Publication Data

US 2006/0253359 A1 Nov. 9, 2006

Related U.S. Application Data

(63) Continuation-in-part of application No. 11/122,510, filed on May 4, 2005.

(51) Int. Cl.
*G06Q 40/00* (2006.01)
(52) U.S. Cl. .......................................... 705/37; 705/35
(58) Field of Classification Search .................. 705/35, 705/37
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,903,201 A | 2/1990 | Wagner | |
| 4,980,826 A | 12/1990 | Wagner | |
| 5,038,284 A | 8/1991 | Kramer | |
| 5,101,353 A | 3/1992 | Lupien et al. | |
| 5,136,501 A | 8/1992 | Silverman et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,315,634 A | 5/1994 | Tanaka et al. | |

(Continued)

FOREIGN PATENT DOCUMENTS

EP 0 752 135 2/1999

(Continued)

OTHER PUBLICATIONS

Demeterfi, Kresimir, et al., "More Than You Ever Wanted to Know About Volatility Swaps," Goldman Sachs Quantitative Strategies Research Notes, Mar. 1999.

(Continued)

*Primary Examiner* — Jagdish N Patel
*Assistant Examiner* — Kevin Poe
(74) *Attorney, Agent, or Firm* — Brinks Hofer Gilson & Lione

(57) ABSTRACT

A method of creating and trading corporate debt security derivative investment instruments on an exchange, as well as a trading facility for trading such derivatives, is disclosed. Corporate debt security derivative investment instruments are created by identifying a credit rating service that includes a plurality of risk categories. Unique monetary values are mapped to risk categories and an entity rated by the credit rating service is identified. A corporate debt security derivative investment instrument is then created whose value is determined at least in part by the monetary value to which the risk category associated with the rated entity is mapped.

7 Claims, 5 Drawing Sheets

| CREDIT RATING | MAPPED VALUES |
|---|---|
| AAA | $125 |
| AA | $120 |
| A | $115 |
| BBB | $110 |
| BB | $105 |
| B | $100 |
| CCC | $95 |
| CC | $90 |
| C | $85 |

U.S. PATENT DOCUMENTS

| | | |
|---|---|---|
| 5,557,517 A | 9/1996 | Daughterty, III |
| 5,664,115 A | 9/1997 | Fraser |
| 5,689,652 A | 11/1997 | Lupien et al. |
| 5,715,402 A | 2/1998 | Popolo |
| 5,744,877 A | 4/1998 | Owens |
| 5,774,877 A | 6/1998 | Patterson, Jr. et al. |
| 5,787,402 A | 7/1998 | Potter et al. |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,813,009 A | 9/1998 | Johnson et al. |
| 5,819,237 A | 10/1998 | Garman |
| 5,845,266 A | 12/1998 | Lupien et al. |
| 5,873,071 A | 2/1999 | Ferstenberg et al. |
| 5,905,974 A | 5/1999 | Fraser et al. |
| 5,913,202 A | 6/1999 | Motoyama |
| 5,915,209 A | 6/1999 | Lawrence |
| 5,915,245 A | 6/1999 | Patterson, Jr. et al. |
| 5,924,082 A | 7/1999 | Silverman et al. |
| 5,950,176 A | 9/1999 | Keiser et al. |
| 5,950,177 A | 9/1999 | Lupien et al. |
| 5,963,923 A | 10/1999 | Garber |
| 5,970,479 A | 10/1999 | Spepherd |
| 5,978,779 A | 11/1999 | Stein et al. |
| 6,012,046 A | 1/2000 | Lupien et al. |
| 6,014,627 A | 1/2000 | Togher et al. |
| 6,014,643 A | 1/2000 | Minton |
| 6,016,483 A | 1/2000 | Rickard et al. |
| 6,018,983 A | 2/2000 | Jones et al. |
| 6,021,397 A | 2/2000 | Jones et al. |
| 6,035,288 A | 3/2000 | Solomon |
| 6,076,068 A | 6/2000 | DeLapa et al. |
| 6,119,103 A | 9/2000 | Basch et al. |
| 6,195,647 B1 | 2/2001 | Martyn et al. |
| 6,199,050 B1 | 3/2001 | Alaia et al. |
| 6,230,146 B1 | 5/2001 | Alaia et al. |
| 6,247,000 B1 | 6/2001 | Hawkins et al. |
| 6,263,321 B1 | 7/2001 | Daughtery, III |
| 6,266,651 B1 | 7/2001 | Woolston |
| 6,269,346 B1 | 7/2001 | Cristofich et al. |
| 6,272,474 B1 | 8/2001 | Garcia |
| 6,278,982 B1 | 8/2001 | Korhammer et al. |
| 6,282,521 B1 | 8/2001 | Howorka |
| 6,285,989 B1 | 9/2001 | Shoham |
| 6,317,727 B1 | 11/2001 | May |
| 6,317,728 B1 | 11/2001 | Kane |
| 6,321,212 B1 | 11/2001 | Lange |
| 6,377,940 B2 | 4/2002 | Tilfors et al. |
| 6,405,180 B2 | 6/2002 | Tilfors et al. |
| 6,421,653 B1 | 7/2002 | May |
| 6,493,682 B1 | 12/2002 | Horrigan et al. |
| 6,505,174 B1 | 1/2003 | Keiser et al. |
| 6,505,175 B1 | 1/2003 | Silverman et al. |
| 6,539,362 B1 | 3/2003 | Patterson, Jr. et al. |
| 6,560,580 B1 | 5/2003 | Fraser et al. |
| 6,564,192 B1 | 5/2003 | Kinney, Jr. et al. |
| 6,601,627 B2 | 8/2003 | Kasai et al. |
| 6,618,707 B1 | 9/2003 | Katz |
| 6,647,374 B2 | 11/2003 | Kansal |
| 7,039,610 B2 | 5/2006 | Morano et al. |
| 7,047,218 B1 | 5/2006 | Wallman |
| 7,085,738 B2 | 8/2006 | Tarrant |
| 7,099,839 B2 | 8/2006 | Madoff et al. |
| 7,225,153 B2 | 5/2007 | Lange |
| 7,233,922 B2 | 6/2007 | Asher et al. |
| 7,236,953 B1 | 6/2007 | Cooper et al. |
| 7,246,093 B1 | 7/2007 | Katz |
| 7,260,554 B2 | 8/2007 | Morano et al. |
| 7,296,025 B2 | 11/2007 | Kung et al. |
| 7,333,950 B2 * | 2/2008 | Shidler et al. ................... 705/35 |
| 7,389,264 B2 | 6/2008 | Kemp, II et al. |
| 2002/0002530 A1 | 1/2002 | May |
| 2002/0013760 A1 | 1/2002 | Arora et al. |
| 2002/0019799 A1 | 2/2002 | Ginsberg et al. |
| 2002/0032629 A1 | 3/2002 | Siegel, Jr. et al. |
| 2002/0052816 A1 | 5/2002 | Clenaghan et al. |
| 2002/0082967 A1 | 6/2002 | Kaminsky et al. |
| 2002/0087365 A1 | 7/2002 | Kavanaugh |
| 2002/0099640 A1 | 7/2002 | Lange |
| 2002/0103738 A1 | 8/2002 | Griebel et al. |
| 2002/0128952 A1 | 9/2002 | Melkomian et al. |
| 2002/0138401 A1 | 9/2002 | Allen et al. |
| 2002/0147670 A1 | 10/2002 | Lange |
| 2002/0152152 A1 | 10/2002 | Abdelnur et al. |
| 2002/0156716 A1 | 10/2002 | Adatia |
| 2002/0156719 A1 * | 10/2002 | Finebaum et al. ............... 705/37 |
| 2002/0198813 A1 | 12/2002 | Patterson, Jr. et al. |
| 2003/0004858 A1 | 1/2003 | Schmitz et al. |
| 2003/0009411 A1 | 1/2003 | Ram et al. |
| 2003/0018567 A1 | 1/2003 | Flitcroft et al. |
| 2003/0018569 A1 | 1/2003 | Eisenthal et al. |
| 2003/0028462 A1 * | 2/2003 | Fuhrman et al. ................ 705/36 |
| 2003/0028468 A1 * | 2/2003 | Wong et al. ..................... 705/37 |
| 2003/0093352 A1 | 5/2003 | Muralidhar et al. |
| 2003/0097319 A1 | 5/2003 | Moldovan et al. |
| 2003/0097325 A1 | 5/2003 | Friesen et al. |
| 2003/0115128 A1 | 6/2003 | Lange et al. |
| 2003/0139993 A1 * | 7/2003 | Feuerverger .................... 705/36 |
| 2003/0139998 A1 | 7/2003 | Gilbert et al. |
| 2003/0167175 A1 | 9/2003 | Salom |
| 2003/0172026 A1 | 9/2003 | Tarrant |
| 2003/0177077 A1 | 9/2003 | Norman |
| 2003/0182220 A1 * | 9/2003 | Galant ............................. 705/36 |
| 2003/0208430 A1 | 11/2003 | Gershon |
| 2003/0220865 A1 * | 11/2003 | Lutnick ........................... 705/37 |
| 2003/0225657 A1 | 12/2003 | Whaley et al. |
| 2003/0225658 A1 | 12/2003 | Whaley |
| 2003/0236738 A1 | 12/2003 | Lange et al. |
| 2004/0019554 A1 | 1/2004 | Merold et al. |
| 2004/0024681 A1 | 2/2004 | Moore et al. |
| 2004/0030630 A1 | 2/2004 | Tilfors et al. |
| 2004/0088242 A1 | 5/2004 | Ascher et al. |
| 2004/0103050 A1 | 5/2004 | Long |
| 2004/0111358 A1 | 6/2004 | Lange et al. |
| 2004/0117284 A1 | 6/2004 | Speth |
| 2004/0133439 A1 * | 7/2004 | Noetzold et al. .................. 705/1 |
| 2004/0158520 A1 | 8/2004 | Noh |
| 2004/0172352 A1 | 9/2004 | Deretz |
| 2004/0199450 A1 * | 10/2004 | Johnston et al. ................ 705/37 |
| 2004/0215538 A1 | 10/2004 | Smith et al. |
| 2004/0236636 A1 | 11/2004 | Lutnick et al. |
| 2004/0267657 A1 | 12/2004 | Hecht |
| 2005/0027643 A1 | 2/2005 | Amaitis et al. |
| 2005/0044019 A1 | 2/2005 | Novick et al. |
| 2005/0049948 A1 * | 3/2005 | Fuscone .......................... 705/35 |
| 2005/0097027 A1 | 5/2005 | Kavanaugh |
| 2005/0125326 A1 | 6/2005 | Nangalia et al. |
| 2005/0144104 A1 | 6/2005 | Kastel |
| 2005/0149428 A1 | 7/2005 | Gooch et al. |
| 2005/0165669 A1 | 7/2005 | Montanaro et al. |
| 2005/0209945 A1 | 9/2005 | Ballow et al. |
| 2005/0216384 A1 | 9/2005 | Partlow et al. |
| 2005/0267833 A1 | 12/2005 | Brodersen et al. |
| 2006/0008016 A1 | 1/2006 | Balakrishnan et al. |
| 2006/0036531 A1 | 2/2006 | Jackson et al. |
| 2006/0100949 A1 | 5/2006 | Whaley et al. |
| 2006/0106700 A1 | 5/2006 | Boren et al. |
| 2006/0106713 A1 | 5/2006 | Tilly et al. |
| 2006/0143099 A1 | 6/2006 | Partlow et al. |
| 2006/0149659 A1 | 7/2006 | Carone et al. |
| 2006/0167788 A1 | 7/2006 | Tilly et al. |
| 2006/0167789 A1 | 7/2006 | Tilly et al. |
| 2006/0253354 A1 | 11/2006 | O'Callahan |
| 2006/0253355 A1 | 11/2006 | Shalen |
| 2006/0253359 A1 | 11/2006 | O'Callahan et al. |
| 2006/0253367 A1 | 11/2006 | O'Callahan et al. |
| 2006/0253368 A1 | 11/2006 | O'Callahan et al. |
| 2006/0253369 A1 | 11/2006 | O'Callahan |
| 2006/0253370 A1 | 11/2006 | Feuser et al. |
| 2007/0011081 A1 | 1/2007 | Bok et al. |
| 2007/0078740 A1 | 4/2007 | Landle et al. |
| 2007/0106585 A1 | 5/2007 | Miller |
| 2007/0112659 A1 | 5/2007 | Shalen et al. |
| 2007/0282758 A1 | 12/2007 | Vischer et al. |
| 2008/0059356 A1 | 3/2008 | Brodsky et al. |
| 2008/0065560 A1 | 3/2008 | Bloom |
| 2008/0120249 A1 | 5/2008 | Hiatt |

| | | | |
|---|---|---|---|
| 2008/0120250 A1 | 5/2008 | Hiatt, Jr. | |
| 2008/0154790 A1 | 6/2008 | Hiatt | |
| 2008/0183640 A1 | 7/2008 | Shalen | |
| 2008/0243676 A1 | 10/2008 | Smith | |

FOREIGN PATENT DOCUMENTS

| | | |
|---|---|---|
| EP | 0 952 536 A1 | 10/1999 |
| WO | WO 00/28449 | 5/2000 |
| WO | WO 00/48053 | 8/2000 |
| WO | WO 00/57307 A1 | 9/2000 |
| WO | WO 00/70506 | 11/2000 |
| WO | WO 01/22263 | 3/2001 |
| WO | WO 01/22269 | 3/2001 |
| WO | WO 01/22313 | 3/2001 |
| WO | WO 01/22315 | 3/2001 |
| WO | WO 01/22332 | 3/2001 |
| WO | WO 01/88808 | 11/2001 |
| WO | WO 02/37396 A2 | 5/2002 |
| WO | WO 02/077766 A2 | 10/2002 |

OTHER PUBLICATIONS

CBOE Futures Exchange letter dated May 17, 2004, to Commodity Futures Trading Commission with accompanying pages containing rules, terms, and conditions for a new product to be traded on the CBOE Futures Exchange, 8 pages.
Press Release article, "CBOE Announces Launch of Futures on VIX: First Tradable Volatility Product Will be Offered on New CBOE Futures Exchange," Sep. 5, 2003, two pages.
Non-Final Office Action issued in U.S. Appl. No. 11/122,510, mailed Jun. 20, 2008 (15 pages).
Final Office Action issued in U.S. Appl. No. 11/122,510, mailed Jan. 26, 2009 (13 pages).
Non-Final Office Action issued in U.S. Appl. No. 11/122,510, mailed May 11, 2010 (9 pages).
Final Office Action issued in U.S. Appl. No. 11/122,510, mailed Jan. 19, 2011 (13 pages).
SEC Notice, Release No. 34-51107, SR-CBOE-2004-75, Federal Register vol. 70, No. 23, dated Friday, Feb. 4, 2005, pp. 6051-6057.
PCX Plus *The Pacific Exchange*, PCX Plus Overview, Oct. 9, 2003, six pages.
The National Association of Securities Dealer, Inc. "NASD Notice to members" 00-65, Sep. 2000, 5 pages.
Special Study: Payment for Order Flow and Internalization in the Options Markets, www.sec.gov/new/studies/ordpay.htm, printed on Oct. 22, 2001, 39 pages.
Domowitz, Ian, "A taxonomy of automated trade execution systems", 12 Journal of Int'l Money and Finance, p. 607-631, dated 1993.
Evans et al. "The Effects of Electronic Trading System on Open-outcry Commodity Exchange", Social Science 410, Nov. 1998.
Wang, G. et al. "Information Transmission and Electronic Versus Open Outcry Trading Systems: An Intraday Analysis of E-Mini S&P 500 Futures, S&P 500 Index Futures and S&P 500 Cash Index", paper presented in Thailand on Dec. 3-4, 2001.
Tsang, R. "Open outcry and electronic trading in futures exchanges", Bank of Canada Review, Spring 1999, pp. 21-39.
Elind Computers Private LMTD, "Online Global Trading System for Marketplaces", brochure, 2002.
C. Danis, et al. "Alternatives to an Open Outcry Market: An Issue of Supporting Cooperation in a Competitive Situation", IBM TJ Watson Research Center, USA.
Clemens et al., "Segmentation, differentiation, and flexible pricing: Experiences with information technology and segment-tailored strategies", *Journal of Management Information Systems: JMIS*, vol. 11, No. 2, pp. 9-36, Fall 1994.
"Squeezing the poor", *Guardian*, p. 8, Feb. 11, 1997.
"La libre competencia sacude a las electricas", *Actualidad Economica*, p. 18, Sep. 30, 1996.
Souter, Gavin, "Bermuda's reinsurers eager to please", *Business Insurance*, vol. 28, No. 44, p. 77, Oct. 31, 1994.
"The Electronic Component", The Options Institute Online Learning Center, obtained at the internet address: http://www.cboe.com/LearnCenter/cboeeducation/Course_02_02/mod_02_03.html.

E. Clemons et al., "Information Technology and Screen-Based Securities Trading: Pricing the Stock and Pricing the Trade", *Management Science*, vol. 43, No. 12, Dec. 1997.
"The Pandora's Box over autoquotes; Industry Trend or Event", *Wall Street & Technology*, Section No. 3, vol. 13, p. 38; ISSN: 1060-989X, Mar. 1997.
"How is a Trade Executed—Limit Order", *Nasdaq*, dated Mar. 7, 2000, One Page.
S. Cosgrove, "Courting Retail, Institutional Customers, CBOE, AMEX Get Creative", *Knight-Ridder Financial News*, Jan. 29, 1993.
Self-Regulatory Organizations: Proposed Rule Change by the Cincinnati Stock Exchange Relating to Small Order Execution Guaranty, 1985 WL 547562; SEC Release No. 22330, Aug. 15, 1985.
A Monitoring Report on the Operation of the Cincinnati Stock Exchange National Securities Trading System, U.S. Securities and Exchanges Commission, May 1981.
A Report on the Operation of the Cincinnati Stock Exchange National Securities Trading System 1978-1981, U.S. Securities and Exchange Commission, Sep. 1982.
CBOT Press Release Entitled "Impressive Project Areg. Provides Extended Opportunity in CBOT Financial Complex", dated Jan. 1995, printed from the Internet at http://web.archive.org/web/19990429192354/finance/wat.ch/SCFOA/bulletin/_0001960.htm on Oct. 31, 2005, 3 pages.
A. Frino et al., Price and Time-Priority Versus Pro-Rata Algorithms in Electronically Traded Futures Markets: Simulation Based Performance Characteristics, Oct. 3, 1998, http://www.sirca.org.au/research/database.html (Document 1998009.pdf).
A. Frino et al., The Liquidity of Automated Exchanges: New Evidence From Germany Bund Futures, vol. 8, Journal of International Financial Markets, Institutions and Money, pp. 225-241 (1998).
Self-Regulatory Organization; Chicago Stock Exchange, Inc.; Order Approving Proposed Rule Change Creating the Chicago Match System (59 F.R. 63141) SEC Release No. 34-35030, 1994 SEC LEXIS 3863, Nov. 30, 1994.
A. Sarker et al., "Electronic Trading on Futures Exchanges," Current Issues in Economics and Finance, Federal Reserve Bank of New York, vol. 4, No. 1, Jan. 1998.
Self-Regulatory Organization; Order Approving Proposed Rule Change and Notice of Filing in Order Granting Accelerated Approval of Amendment No. 2 to the Proposed Rule Change by the Philadelphia Stock Exchange, Inc. Relating to Enhanced Specialist Participation in Parity Options Trades, SEC Release No. 34-35429, 60 F.R. 12802, Mar. 8, 1995.
CBOE Rules, CCH (1989) (Rules 6.45-8.80).
CBOE Information Circular IC 93-88 (Nov. 18, 1993).
U.S. Congress, Office of Technology Assessment, "Electronic Bulls and Bears: U.S. Securities Markets and Information Technology", OTA-CIT-469 (Washington, DC: U.S. Government Printing Office, Sep. 1990). (selected excerpts).
Self-Regulatory Organizations; Filing and Order Granting Accelerated Approval of Proposed Rule Change by the Chicago Board Options Exchange, Inc., Relating to System Modifications to the Retail Automated Execution System, SEC Release No. 34-32879, vol. 58, No. 182, Sep. 22, 1993, 49342-49343.
CBOE Regulatory Circular RG 91-71, Dec. 25, 1991.
Notice of Receipt of Plan Filed Pursuant to Section 11A(a)(3)(B) of the Securities Exchange Act of 1934, 1980 WL 29398, SEC Release No. 34-16519, Jan. 22, 1980, 7 pages.
New York Stock Exchange Constitution and Rules (Commerce Clearing House, Inc. New York Stock Exchange Guide) Jul. 15, 1965, pp. 2644-2645; 2682-2683.
R. Teweles et al., The Stock Market, Fifth Edition, John Wiley & Sons, 1987, pp. 176-181.
J. Meeker, The Work of the Stock Exchange, The Ronald Press Company 1923, pp. 108-109.
CBOE Information Circular IC91-15, Feb. 25, 1991.
"smartRay.com Delivers Stock Quotes and Financial Information to Wireless Devices for Free !", PR Newswire, p. 2870, Dec. 16, 1999.
Glen, Jack D., "Trading and information systems in two emerging stock markets", East Asian Executive Reports, vol. 16 No, 12, pp. 8, 14, Dec. 15, 1994.

Michaels, Jenna, "NASD'S Global Fumble", All Street & Technology, vol. 9 No. 11, pp. 5762, Jul. 1992.
"PHLX Files Rule Changes to Improve Handling Orders on Pace", Securities Week, p. 5, Jul. 17, 1989.
"NYSE Votes to Restrict Computerized Trading", San Jose Mercury News, Feb. 5, 1988.
SEC Notice, Release No. 34-47959, SR-CBOE-2002-05, Federal Register vol. 68, No. 110, dated Monday, Jun. 9, 2003, pp. 34441-34448.
Original Rule Filing and Amendment No. 1 to SR-CBOE-2002-05, Submitted to SEC on Jan. 16, 2002, 17 pages.
Amendment No. 2 to SR-CBOE-2002-05, Submitted to SEC on May 16, 2002, 21 pages.
Amendment No. 3 to SR-CBOE-2002-05, Submitted to SEC on Jan. 15, 2003, 69 pages.
Amendment No. 4 to SR-CBOE-2002-05, Submitted to SEC on Apr. 3, 2003, 71 pages.
Amendment No. 5 to SR-CBOE-2002-05, Submitted to SEC on May 15, 2003, 3 pages.
Amendment No. 6 to SR-CBOE-2002-05, Submitted to SEC on May 30, 2003, 28 pages.
SEC Notice, Release No. 34-39086, SR-PCX-97-18, Federal Register vol. 62, No. 185, dated Wednesday, Sep. 24, 1997, pp. 50036-50048.
Angel, James J., "How Best to Supply Liquidity to a Small-Capitalization Securities Market", Georgetown University, Jul. 15, 1996, 27 pages.
SEC Notice, Release No. 34-47676, SR-CBOE-2002-05, Federal Register vol. 68 No. 77, dated Tuesday, Apr. 22, 2003, pp. 19865-19874.
Co-Pending U.S. Appl. No. 60/986,727, filed Nov. 9, 2007.
SEC Notice, Release No. 34-46803, SR-PCX-2002-36, Federal Register vol. 67 No. 222, dated Monday, Nov. 18, 2002, pp. 69580-69592.
Raithel, Tom, article titled "Major Changes Seen for Exchanges", *Evansville Courier and Press*, Apr. 12, 2000, p. B.6.
Sulima, Cheryl, "Volatitly and Variance Swaps", *Capital Markets News*, Federal Reserve Bank of Chicago, Mar. 2001.
Transitions 1-3, *Transitions Trading* website, retrieved using: www.archive.org Jul. 29, 2004 and Dec. 11, 2004.

Bounds for a Volume Weighted Average Price Option, A. W. Stace, Sep. 24, 2004.
Hull, J. and White, A., "The Valuation of Credit Default Swap Options", *Journal of Derivatives*, vol. 10, No. 3, 2003, p. 40.
Duffie, D. and Huang, M., "Swap Rates and Credit Quality", Mar. 31, 1995.
Blahnik, Mike, "Internet Opens Up Trading Frontiers", Star Tribune, Metro Edition, Minneapolis, MN, Retrieved from: http://web.archive.org/web/20040322223904/http://www.trade.com/, dated Jul. 25, 2004.
Bogomolny, Laura,: Wanna Make a Bet?, Canadian Business, Toronto, vol. 77, Iss. 21, Oct. 25 to Nov. 7, 2004.
Sodergreen, John, "Product profile: Economic Derivatives in the Energy Sector", *Futures Industry Magazine*, Jan.-Feb. 2005 issue, retrieved from http://www.futuresindustry/org/fi-magazine-home.asp?v=p&q=1018 on May 20, 2008.
Whaley, Robert. "Return and Rick of CBOE Buy Write Monthly Index", *The Journal of Derivatives*, 2002, pp. 35-42.
Chicago Board of Options Exchange, Inc. Description of the CBOE S & P 500 BuyWrite Index ($BXM^{sm}$), 5 pages, 2004.
Morgan Stanley, "Global Medium-Term Notes, series F", *Registration statement* No. 333-117752, Securities Commission and Exchange, 2004, pp. 22-26.
Chicago Board of Options Exchange, Inc. The New CBOE Volatility Index, 19 pages, 2003.
Vasiliki D. Skintzi, "Implied correlation index: A new measure of diversification", The Journal of Future Markets, Feb. 2005, vol. 25, Iss. 2, pp. 1-3.
U.S. Appl. No. 11/849,835, filed Sep. 4, 2007, entitled "System and Method for Creating and Trading a Derivative Investment Instrument Over a Range of Index Values", Applicant: O'Connell et al.
U.S. Appl. No. 12/112,605, filed Apr. 30, 2008, entitled "System and Method for Creating and Trading a Derivative Investment Instrument Over a Range of Index Values", Applicant: O'Connell et al.
U.S. Appl. No. 12/267,013, filed Nov. 7, 2008, entitled "Method and System for Creating a Volatility Benchmark Index", Applicant: Catherine T. Shalen.
Devore, Jay L., "Probability and Statistics for Engineering and the Sciences, Second Edition", Published 1987 by Wadsworth, Inc., pp. 13-16 and 88-96.

* cited by examiner

US 8,027,904 B2

METHOD AND SYSTEM FOR CREATING AND TRADING CORPORATE DEBT SECURITY DERIVATIVE INVESTMENT INSTRUMENTS

CROSS REFERENCE TO RELATED APPLICATION

This application is a Continuation-In-Part of pending U.S. application Ser. No. 11/122,510, filed May 4, 2005, the entirety of which is hereby incorporated by reference.

TECHNICAL FIELD

The present disclosure relates to methods and systems for creating and trading derivative investment instruments based on a corporate debt security, such as a corporate bond.

BACKGROUND

Lending money involves risk. Regardless of who the borrower is, be it an individual, corporation, municipality, national government, or supranational organization such as the World Bank or the United Nations, there is always a possibility of default. In many cases the risk of default is remote. In others it is less so. Interest rates on loans are determined based on, among other things, a borrower's perceived ability to repay the loan. Paradoxically, a borrower whose ability to repay a loan is less certain will have pay more to borrow money in the form of higher interest rates than a borrower who is perceived to be less of a risk. Because debt plays a vital role in the world's economy, assessing risk is of critical importance to ensuring the desired flow capital from those who have it to those who would use it.

Over time, credit rating services have developed to assist lenders and investors in assessing risk and evaluating the overall credit worthiness of individuals and organizations. These credit rating services produce credit ratings for individuals and organizations that reflect the rated party's ability to repay its debts. Investors and lenders rely on such ratings when deciding whether to extend financing, and on what terms. In the United States, the Securities and Exchange Commission has relied on credit ratings by rating agencies that the markets have recognized as credible. These "nationally recognized statistical rating organizations" ("NRSROs") include several major credit rating services, including A.M. Best Company, Inc. (A.M. Best), Dominion Bond Rating Service Limited (DBRS), Moody's Investor Services (Moody's), Standard and Poor's (S & P), and Fitch's Ratings (Fitch's).

The rating schemes followed by the three major rating services are all similar. Each includes multiple levels, with each level representing a different level of risk, or a different ranking of the perceived ability of a rated entity to meet its debt obligations. A 1 to 3-letter code identifies each of the different levels. For example Moody's defines nine primary risk levels:

Aaa, Aa, A, Baa, Ba, B, Caa, Ca, and C.

According to this system, the Aaa rating is reserved for the entities that demonstrate the strongest credit worthiness. Debt issuers or debt issues rated Aa demonstrate very strong credit worthiness but somewhat less than those rated Aaa, while rated simply those A represent above average credit worthiness. Issuers or issues rated Baa represent average credit worthiness. Those rated Ba demonstrate below average credit worthiness, and those rated B demonstrate weak credit worthiness. Finally, issuers or issues rated Caa demonstrate very weak credit worthiness. Those rated Ca demonstrate extremely weak credit worthiness, and those rated C demonstrate the weakest credit. Moody's also appends a numeric modifier 1, 2 or 3 to the categories Aa through Caa. The numeric modifiers indicate where within the particular risk category the entity being evaluated falls. 1 indicates the top rating within the group. 2 indicates the middle of the group. 3 represents the bottom. The modifiers 1, 2, 3 effectively expand the number of risk categories to a total of twenty-one.

S&P's alphabetic rating system is similar to Moody's. S&P defines its primary risk categories as:

AAA, AA, A, BBB, BB, B, CCC, CC, C, and D.

The definitions of S&P's categories roughly track those of Moody's and need not be explicitly related here. S&P append a (+) or (−) to categories AA to CCC in order to show an entity's relative standing within the major rating categories. With the modifiers, S&P's rating system effectively includes 16 different levels of risk.

Fitch also relies on a letter rating code similar to those already described:

AAA, AA, A, BBB, BB, B, CCC, CC, C, DDD, DD, and D.

Fitch also includes a (+) or (−) modifier to categories AA-CCC to indicate an entities relative position within a category. Thus, Fitch ratings may take on up to 18 different the levels.

The rating services monitor the financial health of the organizations they rate, updating their ratings as conditions warrant. If the rating services perceive a change in an organization's ability to meet its obligations the rating service may downgrade its rating of the organization. In contrast, improved financial circumstances may cause the rating services to upgrade an entity's credit rating. Thus, much like a company's stock price, an entity's credit rating may serve as a barometer of the entity's financial health.

Derivatives are financial securities whose values are derived in part from a value or characteristic of some other underlying asset or variable (the underlying asset). The underlying asset may include securities such as stocks, commodities market indicators and indexes, interest rate, and corporate debt, such as bonds, to name but a few. Two common forms of derivatives are options contracts and futures contracts.

An option is a contract giving the holder of the option the right, but not the obligation, to buy or sell an underlying asset at a specific price on or before a certain date. Generally, a party who purchases an option is said to have taken a long position with respect to the option. The party who sells the option is said to have taken a short position. There are generally two types of options: calls and puts. An investor who has taken a long position in a call option has bought the right to purchase the underlying asset at a specific price, known as the "strike price." If the long investor chooses to exercise the call option, the long investor pays the strike price to the short investor, and the short investor is obligated to deliver the underlying asset.

Alternatively, an investor who has taken a long position in a put option receives the right, but not the obligation to sell the underlying asset at a specified price, again referred to as the strike price on or before a specified date. If the long investor chooses to exercises the put option, the short investor is obligated to purchase the underlying asset from the long investor at the agreed upon strike price. The long investor must then deliver the underlying asset to the short investor. Thus, the traditional settlement process for option contracts involves the transfer of funds from the purchaser of the underlying asset to the seller, and the transfer of the underlying asset from the seller of the underlying asset to the purchaser. Cash settlement, however, is more common. Cash settlement allows options contracts to be settled without actually transferring the underlying asset. A call option is "in-the-money" when the price or value of the underlying asset rises above the strike price of the option. A put option is "in-the-money" when the price or value of the underlying asset falls below the strike price of the option. An at-the-money option wherein the price or value of the underlying asset is equal to the strike price of the option. A call option is out-of-the-money when the price or value of the underlying asset is below the strike price. A put option is out-of-the-money when the price or value of the underlying asset is above the strike price. If an option expires at-the-money or out-of-the-money, it has no value. The short investor retains the amount paid by the long investor (the option price) and pays nothing to the long investor. Cash settlement of an in-the-money option, be it a call or a put, however, requires the short investor to pay to the long investor the difference between the strike price and the current market value of the underlying asset.

Cash settlement allows options to be based on more abstract underlying "assets" such as market indicators, stock indices, interest rates, futures contracts and other derivatives. For example, an investor may take a long position in a market index call option. In this case, the long investor receives the right to "purchase" not the index itself, but rather a cash amount equal to the value of the index (typically multiplied by a multiplier) at a specified strike value. An index call option is in-the-money when the value of the index rises above the strike value. When the holder of an in-the-money index call option exercises the option, the short investor on the opposite side of the contract is obligated to pay the long investor the difference between the current value of the index and the strike price, usually multiplied by the multiplier. If the current value of the index is less than or equal to the strike value, the option has no value. An index put option works in the same way but in reverse, having value, or being in-the-money when the value of the index falls below the strike value.

Futures contracts are another common derivative security. In a futures contract a buyer purchases the right to receive delivery of an underlying commodity or asset on a specified date in the future. Conversely, a seller agrees to deliver the commodity or asset to an agreed location on the specified date. Futures contracts originally developed in the trade of agricultural commodities, but quickly spread to other commodities as well. Because futures contracts establish a price for the underlying commodity in advance of the date on which the commodity must be delivered, subsequent changes in the price of the underlying asset will inure to the benefit of one party and to the detriment of the other. If the price rises above the futures price, the seller is obligated to deliver the commodity at the lower agreed upon price. The buyer may then resell the received product at the higher market price to realize a profit. The seller in effect loses the difference between the futures contract price and the market price on the date the goods are delivered. Conversely if the price of the underlying commodity falls below the futures price, the seller can obtain the commodity at the lower market price for delivery to the buyer while retaining the higher futures price. In this case the seller realizes a profit in the amount of the difference between the current market price on the delivery date and the futures contract price. The buyer sees an equivalent loss.

Like options contracts, futures contracts may be settled in cash. Rather than actually delivering the underlying asset, cash settlement merely requires payment of the difference between the market price of the underlying commodity or asset on the delivery date and the futures contract price. The difference between the market price and the futures price is to be paid by the short investor to the long investor, or by the long investor to the short investor, depending on which direction the market price has moved. If the prevailing market price is higher than the contract price, the short investor must pay the difference to the long investor. If the market price has fallen, the long investor must pay the difference to the short investor.

Again, like options, cash settlement allows futures contracts to be written against more abstract underlying "assets" or "commodities," such as market indicators, stock indices, interest rates, futures contracts and other derivatives. For example, an investor may take a long position in a market index futures contract. In this case, the long investor "buys" the index at a specified futures price (i.e. a future value of the index on the "delivery" date). The index based futures contract is cash settled. One party to the contract pays the difference between the futures price and the actual value of the index (often multiplied by a specified multiplier) to the other investor depending on which direction the market has moved. If the value of the index has moved above the futures price, or futures value, the short investor pays the difference the long investor. If the value of the index has moved below the futures price, or futures value the long investor pays the difference to the short investor.

Cash settlement provides great flexibility regarding the types of underlying assets that derivative investment instruments may be built around. Essentially any variable whose value is subject to change over time, may serve as the underlying asset for a derivative investment instrument. While standard derivatives may be based on many different underlying assets, there is a need for derivative investment instruments that relate to the financial health of various organizations.

SUMMARY

The present invention relates to systems and methods for creating and trading corporate debt security derivative investment instruments. A corporate debt security derivative investment instrument is an instrument that derives its value based on the credit rating of an entity such as a corporation, municipal government, national government, or supranational organization. The risk categories of an independent credit rating service's rating scheme are mapped to individual monetary values. When an entity is rated by the credit rating service, the rating service assigns a risk level that identifies the perceived credit worthiness of the rated entity. The applicable rating may change over time according to the financial health of the rated entity. As the rated entity's credit rating rises and falls, so do the values to which the various ratings are mapped. According to one aspect, corporate debt security derivative investment instruments such as corporate debt security options may be created which are based on the mapped values associated with an entity's credit rating.

A method of creating and trading corporate debt security derivative investment instruments may include identifying a credit rating service that rates various entities and organizations using a credit rating scheme that includes a plurality of risk categories. The credit rating service rates an entity's credit worthiness by associating a risk category with the entity that accurately reflects the credit rating services assessment of the rated entities credit worthiness. The various risk categories are mapped to unique monetary values, such that if the risk category associated with a rated entity is changed, i.e. upgraded or downgraded, the mapped value will likewise change accordingly. Next, an entity that is rated by credit rating service is identified. Derivative investment instruments such as corporate debt security call and put options and futures contracts may be created based on the monetary values to which the rated entity's credit rating is mapped. The value of the corporate debt security derivative investment instrument is determined at least in part by the monetary value to which the current risk category associated with the rated entity is mapped.

According to another aspect, a method of creating a derivative investment instrument based on a corporate bond is provided. The method includes identifying a corporate bond as an underlying security for the derivative investment instrument and associating the underlying security with an exercise price, wherein the exercise price is listed on an exchange. A corporate bond security derivative instrument is generated whose value is determined at least in part by the exercise price to which the underlying security is associated.

According to yet another aspect, a method of selecting a corporate bond for use in a derivative investment instrument based thereon is provided. The method includes identifying at least one eligible corporate bond in accordance with predefined listing standards, sorting the at least one eligible corporate bond based on a rating and a maturity, aggregating trade information for the at least one eligible corporate bond, and ranking the at least one eligible corporate bond based on the trade information.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the appended claims.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

As described herein, derivative investment instruments are disclosed that are based on the movements of an organization's credit rating. In the same way that traditional options and futures contracts derive their value based on changes in the market price or value of an underlying asset, the disclosed derivative investments derive their value based on changes in an entity's credit rating. The credit rating derivatives may encompass options and futures-type instruments and may be traded on an exchange, in an open outcry format, electronically or in a combination of open outcry and electronic formats.

Figure 1:
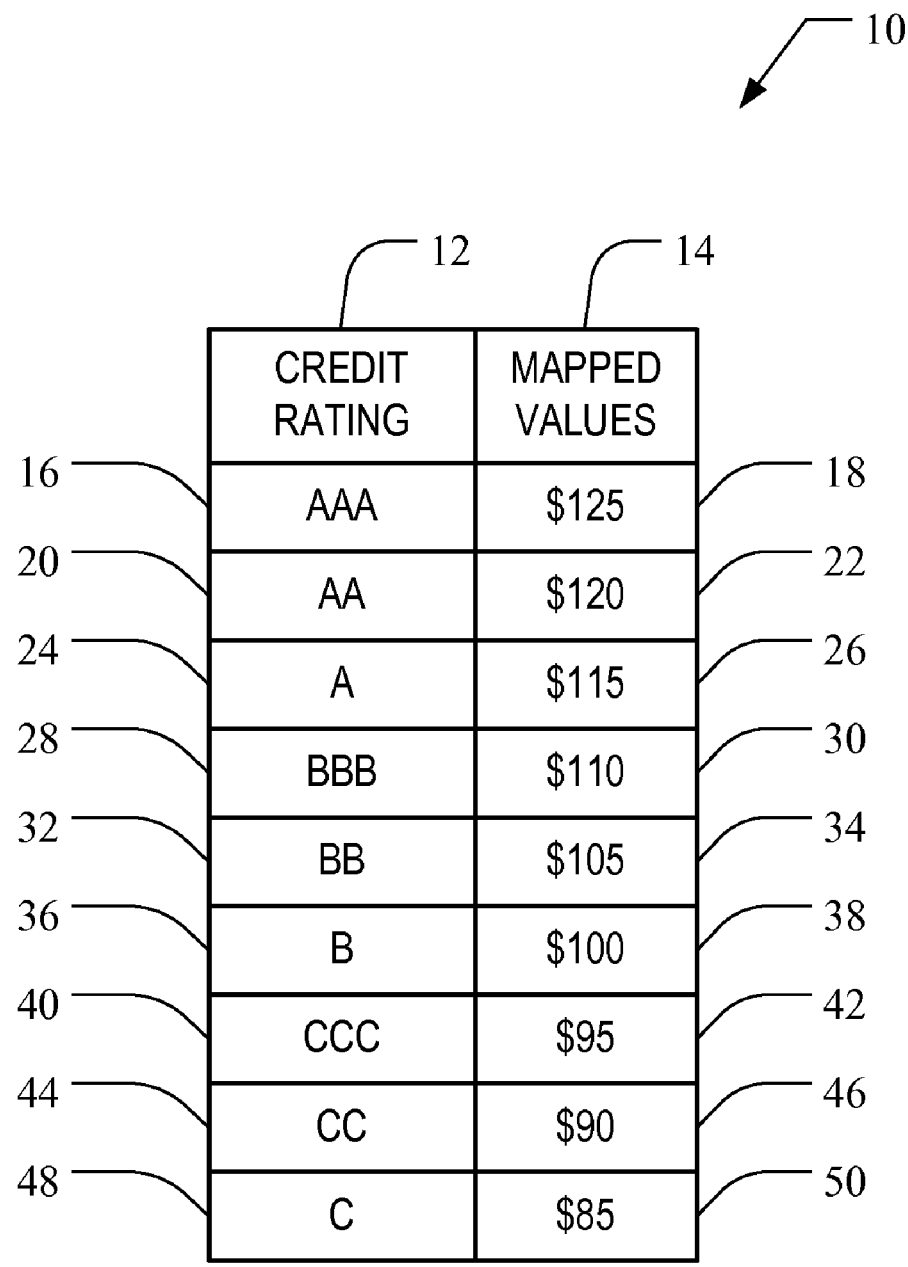
FIG. 1 is a table showing the risk categories of a credit rating system mapped to corresponding monetary values.

According to one embodiment, the various credit rating levels of a credit rating service's rating scheme are mapped to specific monetary values. For example, FIG. 1 shows a table 10 mapping the primary risk categories of S&P's credit rating scheme to various dollar amounts. Table 10 includes two columns. The first column 12 contains the letter ratings defining the different risk categories. As described above, the S&P credit rating scheme includes nine primary risk categories AAA, AA, A, BBB, BB, B, CCC, CC, and C. (The number of categories is actually expanded by the addition of the (+) and (−) modifiers to rating categories AA-CCC but, for ease of illustration, the modifiers have been omitted.) The second column 14 contains the dollar values to which the primary risk categories of column 12 are mapped. In the present example, the highest rating AAA is mapped to $125. AA is mapped to $120 and so forth in $5 decrements until the lowest rating C is mapped to $85.

The mapping of risk categories to monetary values is substantially arbitrary. A different credit rating scheme may be employed having more or less risk categories. For example, Moody's or Fitch's rating systems may have been employed. The modifiers (1), (2), (3) or (+) and (−) may be included to increase the number of risk categories, (increasing the number of mapped values as a result). Or a different rating scheme altogether may be selected. A different currency may be employed as the monetary unit for column 14. Different mapped values may be employed, with different increments there between. The only restriction regarding the selection of the mapped values is that the mapped values progress in a logical manner that corresponds with the progression of their associated risk categories.

The monetary values to which the various credit rating risk categories are mapped have many similarities with corporate share prices, commodity prices, and market indexes. It is preferred that only a single risk category (AAA, AA, A, etc.) 16, will be applied to a rated entity (corporation, municipal government, national government, supranational, etc.) at any given time. However, the credit rating risk category applied to describe the entity's credit worthiness may in fact change over time depending on the rated entity's perceived ability to repay its debts. As the credit rating risk category changes, the mapped monetary value changes with it. For example, for an entity having a B credit rating the associated mapped value is $100. If the entity's credit rating is upgraded to BB, the corresponding mapped value is $105. Similarly, if the entity's rating is downgraded to CCC, the corresponding mapped value is $95. Thus, just like a company's share price, which moves up and down with the company's performance, or just as a market index goes up and down based on the performance of a group of stocks, or just as commodity prices move up and down based on supply and demand, so the mapped values associated with an entity's credit rating will rise and fall with chances in the entity's perceived ability to pay its debts. And just as derivative investment instruments may be written based on corporate share prices, market indexes or commodity prices, so to may derivative investment instruments be written based on the monetary values associated with an entity's credit rating.

A corporate debt security call option may be created as follows. A long investor may choose to buy the right to "purchase" an entity's corporate debt security at a specified category or strike value, such as BB or $105, the value to which a BB credit rating is mapped. If the entity's credit rating improves before expiration of the option, for example if the entity's credit rating is upgraded to AA, the call option will be in-the-money. This situation corresponds exactly with a standard in-the-money call option based on a company's share price. When a corporate share price rises above the strike price, a call option is in-the-money. The long investor is entitled to collect the difference between the actual share price and the strike price. In the case of the corporate debt security call option, the strike price is the credit rating category BB, or the corresponding mapped value $105. When the entity's credit rating is upgraded to AA, the current credit rating is several levels above the BB strike rating. Similarly, the value mapped to the current credit rating, $120, is $15 above the BB strike price. Or we can say that the value or price to $105 corresponds to the value to which the BB strike rating is mapped. The long investor bought the right to "purchase" the entity's corporate debt security at BB or $105, since current rating is AA, which maps to $120, the long investor is entitled to collect the difference between the present value $120 and the strike value $105 or a total of $15. Since the corporate debt security option is to be settled in cash, the short investor who sold the option is obligated to pay the $15 to the long investor.

A corporate debt security put option operates in much the same way, only in reverse. A long investor may choose to buy the right to "sell" an entity's corporate debt security at a specified category or strike value such A or $115, the value to which an A credit rating is mapped. If the entity's credit rating is downgraded to a level below A before the expiration of the option, for example if the entity's credit rating is downgraded to CC, the corporate debt security put option will be in-the-money. This situation corresponds exactly with an in-the-money put option based on a company's share price. When a corporate share price falls below the strike price, the put option is in-the-money. The short investor who sold the option must pay the difference between the current share price and the strike price to the long investor. In the case of the present corporate debt security put option, the strike rating is AA. This maps to a strike value or strike price, of $120. When the entity's credit rating is downgraded CC, the credit rating is several levels below the A strike rating. Similarly, value to which the CC rating is mapped, $90, is lower than the $115 value to which the strike value is mapped. In this case, the long investor bought the right to "sell" the corporate debt security at A or $115. Since the current rating is CC which maps to $90, the long investor is entitled to collect the difference. Since the corporate debt security option is to be cash settled, the short investor is obligated to pay the $25 difference between A strike rating ($120) and the current CC rating ($90).

In another example, a corporate debt security may be in the form of a corporate bond and a derivative investment instrument based on the corporate bond can be created. A corporate bond is type of bond that is issued by a corporation. Corporate bonds tend to pay higher rates than other bonds due to their increased level of risk. Generally, the bondholder receives interest payments (yield) and the principal is repaid on a fixed maturity date (between 1 to 30 years). Corporate bonds have a wide range of ratings and yields because the financial stability of the issuers can vary widely. A high-quality blue chip company might have bonds carrying an investment-grade rating such as AA (with a low yield but a lower risk of default), while a startup company might have bonds carrying a "junk bond" rating (with a high yield but a higher risk of default). In such an example, a corporate bond is identified as an underlying security for the derivative investment instrument. The underlying security is then associated with an exercise price, with the exercise price listed on an exchange. The resulting corporate bond security derivative instrument is generated with a value that is determined at least in part by the exercise price to which the underlying security is associated. Likewise, a method of selecting a corporate bond for use in a derivative investment instrument can be accomplished by identifying at least one eligible corporate bond in accordance with predefined listing standards, such as those detailed in the examples herein. The identified eligible corporate bond(s) are then sorted based on a rating and a maturity, with trade information aggregated for the eligible corporate bond(s). The identified eligible corporate bond(s) are subsequently ranked based on the trade information. Such corporate bond-based derivative investment instruments may include call and/or put options.

Next we will consider a credit rating futures contract. Again referring to the table 10 in FIG. 1, the values to which the various credit rating risk categories are mapped may function as the commodity or asset price for a credit rating futures contract. A long investor may anticipate that a particular entity's credit rating will be at or above a certain level at some time in the future. A short investor may hold the opposite view that the entity's credit rating will in fact be below the level anticipated by the long investor. For example, assume that the long investor believes the entity's credit rating will be at A or above BB rating and the short investor believes it will be below that level on a specified date in the future.

The long and short investors may then enter into a futures agreement wherein the long investor agrees to "buy" the entity's credit rating on the specified date for the amount corresponding to the BB rating, or $105. If, on the specified date, the entity's credit rating has been upgraded to a level above the BB futures rating, the short investor will be obligated to pay the difference between the value to which the actual credit rating is mapped, and the $105 value to which the BB futures rating is mapped. For example, if the entity's credit rating had been upgraded and stands at AAA on the specified date, the short investor would be obligated to pay the long investor the difference between $125, the value to which an AAA rating is mapped, and $105, the value to which the BB futures rating is mapped, for a total of $20. Conversely, if on the specified date the entity's credit rating has been downgraded to a level below the futures rating, the long investor will be obligated to pay the difference between the value to which the actual credit rating is mapped and the $105 value to which the BB futures rating is mapped. For example, if the entity's credit rating had been downgraded and stands at C rating on the expiration date, the long investor would be obligated to pay to the short investor the difference between $85, the value to which a C credit rating is mapped, and $105, the value to which the BB futures credit rating is mapped, or a total of $20.

Figure 2:
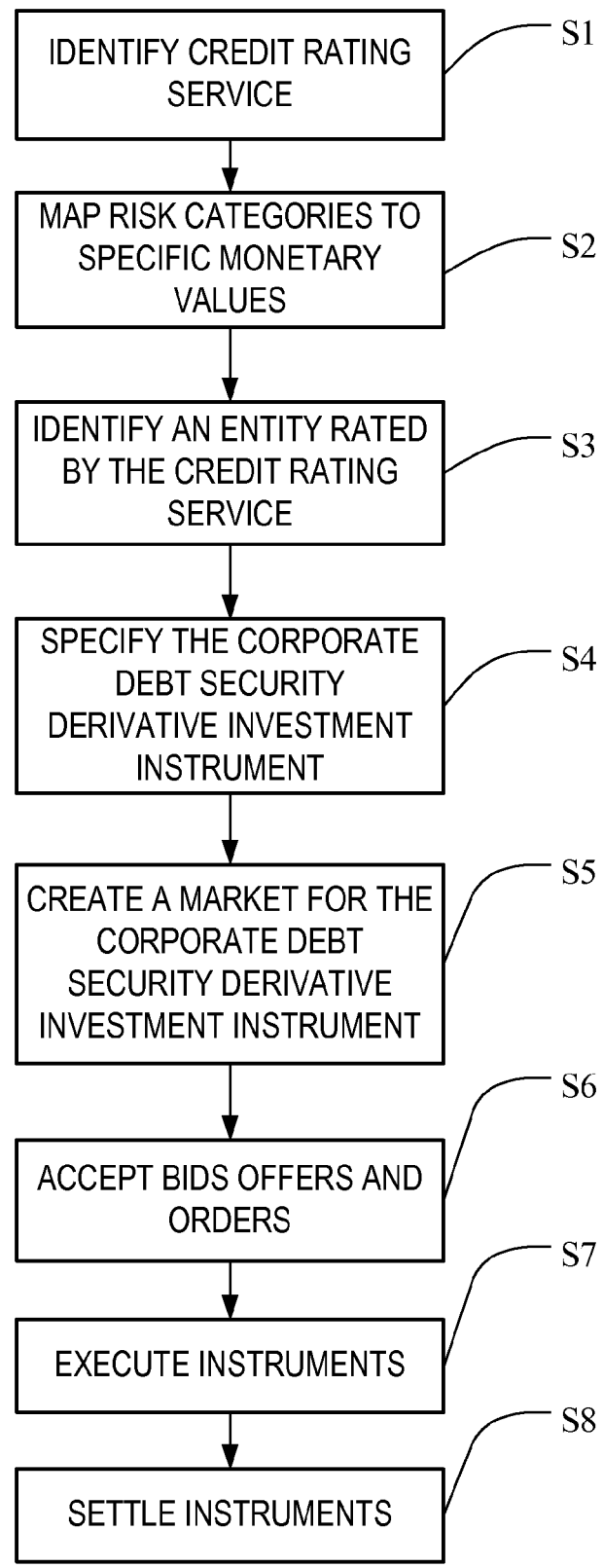
FIG. 2 is flow chart showing a method of creating and trading corporate debt security derivative investment instruments.

FIG. 2 shows a flow chart of a method of creating and trading corporate debt security derivative investment instruments. According to one embodiment, step S1 is to identify a credit rating service whose rating of an entity or organization will serve as the basis of a derivative investment instrument. Step S2 is to map the various risk categories of the rating services rating scheme to specific monetary values. Step S3 is to identify an entity which is rated by the credit rating service identified in Step S1, and whose credit rating is to serve as the basis for the corporate debt security derivative instruments. Step S4 is to specify a corporate debt security derivative instrument based on the credit rating of the entity identified in Step S3 and the monetary values to which the credit risk categories of the credit rating service's rating scheme are mapped to. Step S5 is to create a market for the corporate debt security derivative instrument. Step S6 is to accept bids, offers and purchase orders for both long and short positions corporate debt security derivative instruments which are to be created according to the corporate debt security derivative investment instrument specified in step S4. Step S7 is to execute corporate debt security derivative investment instrument by matching corresponding orders for long and short positions. And, finally, step S8 is to settle positions in the executed corporate debt security derivative investment instruments.

The corporate debt security derivative investment instruments discussed herein may be traded on an exchange. The exchange may be a traditional open outcry exchange, or it may be an electronic trading platform such as the Chicago Board Options Exchange (CBOE) Futures Network (CFN). Employing the method outlined in FIG. 2, the exchange may from time to time identify entities whose credit ratings may be of interest to investors. The exchange may decide to specify corporate debt security derivative investment instruments such as corporate debt security option contracts based on the entities credit rating, as determined by an independent credit rating service.

Creating a market for the corporate debt security derivative investment instruments may be accomplished by listing one or more specified contracts on an exchange or trading platform. Listing a contract includes disseminating information about the contract to potential investors and providing a mechanism whereby investors may make bids and offers and place orders for the contracts. Corporate debt security derivative investment instruments may be traded on a trading facility which disseminates information regarding contracts traded on the platform, and allows brokers and dealers to place orders for customers who enter bids and make offers to buy and sell positions in such contracts. One suitable trading platform is the CBOEdirect® electronic trading platform in use at the Chicago Board Options Exchange, Incorporated of Chicago, Ill.

Essentially, once a contract is defined and listed, the CBOEdirect electronic trading platform, in conjunction with other backend systems of the exchange, is responsible for all of the remaining steps of the method shown in FIG. 2. CBOE direct accepts bids and offers from investors or brokers (Step S6), and executes marketable orders by matching buyers to sellers (Step S7), and settles the contracts (Step S8).

Figure 3:
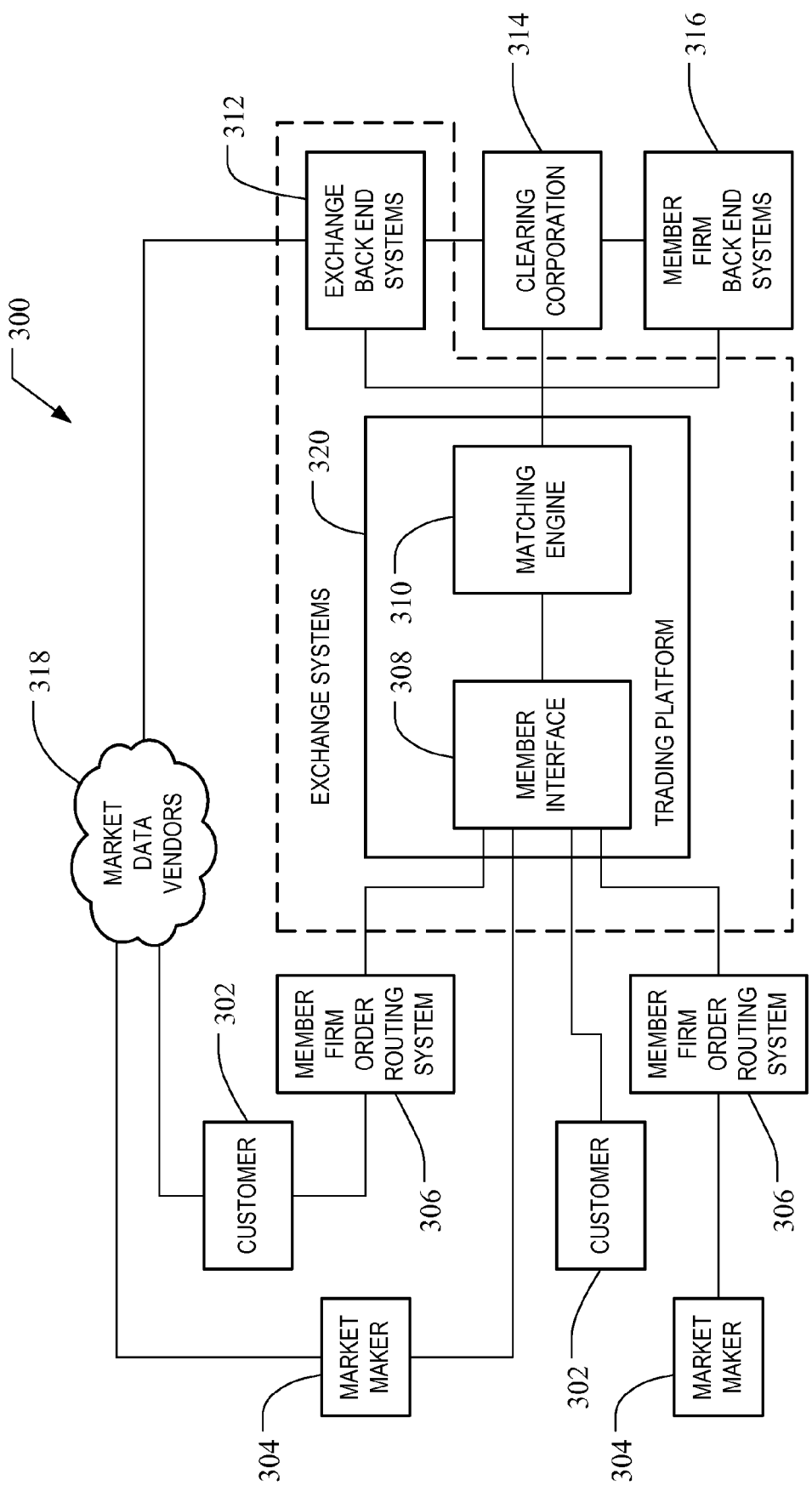
FIG. 3 is a block diagram of an electronic trading facility for trading corporate debt security derivative investment instruments.

FIG. 3 shows an electronic trading system 300 which may be used for listing and trading corporate debt security derivative investment instruments. The system 300 includes components operated by an exchange, as well as components operated by others who access the exchange to execute trades. The components shown within the dashed lines are those operated by the exchange. Components outside the dashed lines are operated by others, but nonetheless may be used in the operation of a functioning exchange. The exchange components of the trading system 300 include an electronic trading platform 320, a member interface 308, a matching engine 310, and backend systems 312. Some backend systems that may be operated by entities separate from the exchange and are integrated into the tasks of processing trades and settling contracts may include the Clearing Corporation's systems 314, and member firms' backend systems 316.

Market makers may access the trading platform 320 directly through personal input devices 304 which communicate with the member interface 308. Market makers may quote prices for digital futures contracts. Non-member customers 302, however, must access the exchange through a member firm. Customer orders are routed through member firm routing systems 306. The member firms' routing systems 306 forward the orders to the exchange via the member interface 308. The member interface 308 manages all communications between the member firm routing systems 306 and market makers' personal input devices 304; determines whether orders may be processed by the trading platform; and determines the appropriate matching engine for processing the orders. Although only a single matching engine 310 is shown in FIG. 3, the trading platform 320 may include multiple matching engines. Different exchange traded products may be allocated to different matching engines for efficient execution of trades. When the member interface 302 receives an order from a member firm routing system 306, the member interface 308 determines the proper matching engine 310 for processing the order and forwards the order to the appropriate matching engine. The matching engine 310 executes trades by pairing corresponding marketable buy/sell orders. Non-marketable orders are placed in an electronic order book.

Once orders are executed, the matching engine 310 may send details of the executed transactions to the exchange backend systems 312, to the Clearing Corporation systems 314, and to the member firms' backend systems 316. The matching engine may also update the order book to reflect changes in the market based on the executed transactions. Orders that previously were not marketable may become marketable due to changes in the market. If so, the matching engine 310 may execute these orders as well.

The exchange backend systems 312 perform a number of different functions. For example, contract definition and listing data originate with the exchange backend systems 312. Pricing information for corporate debt security derivative investment instruments is disseminated from the exchange backend systems to market data vendors 318. Customers 302, market makers 304, and others may access the market data regarding derivative investment instruments via, for example, proprietary networks, on-line services, and the like. The exchange backend systems also monitor the credit ratings of the entities on which the derivative investment instruments are based. At settlement, the backend systems 312 determine the appropriate settlement amounts and supply final settlement data to the Clearing Corporation. The Clearing Corporation acts as the exchange's bank and performs a final mark-to-market on member firm margin accounts based on the positions taken by the member firms' customers. The final mark-to-market reflects the final settlement amounts for corporate debt security derivate investment instruments, and the Clearing Corporation debits/credits member firms' accounts accordingly. These data are also forwarded to the member firms' systems 316 so that they may update their customer accounts as well.

Figure 4:
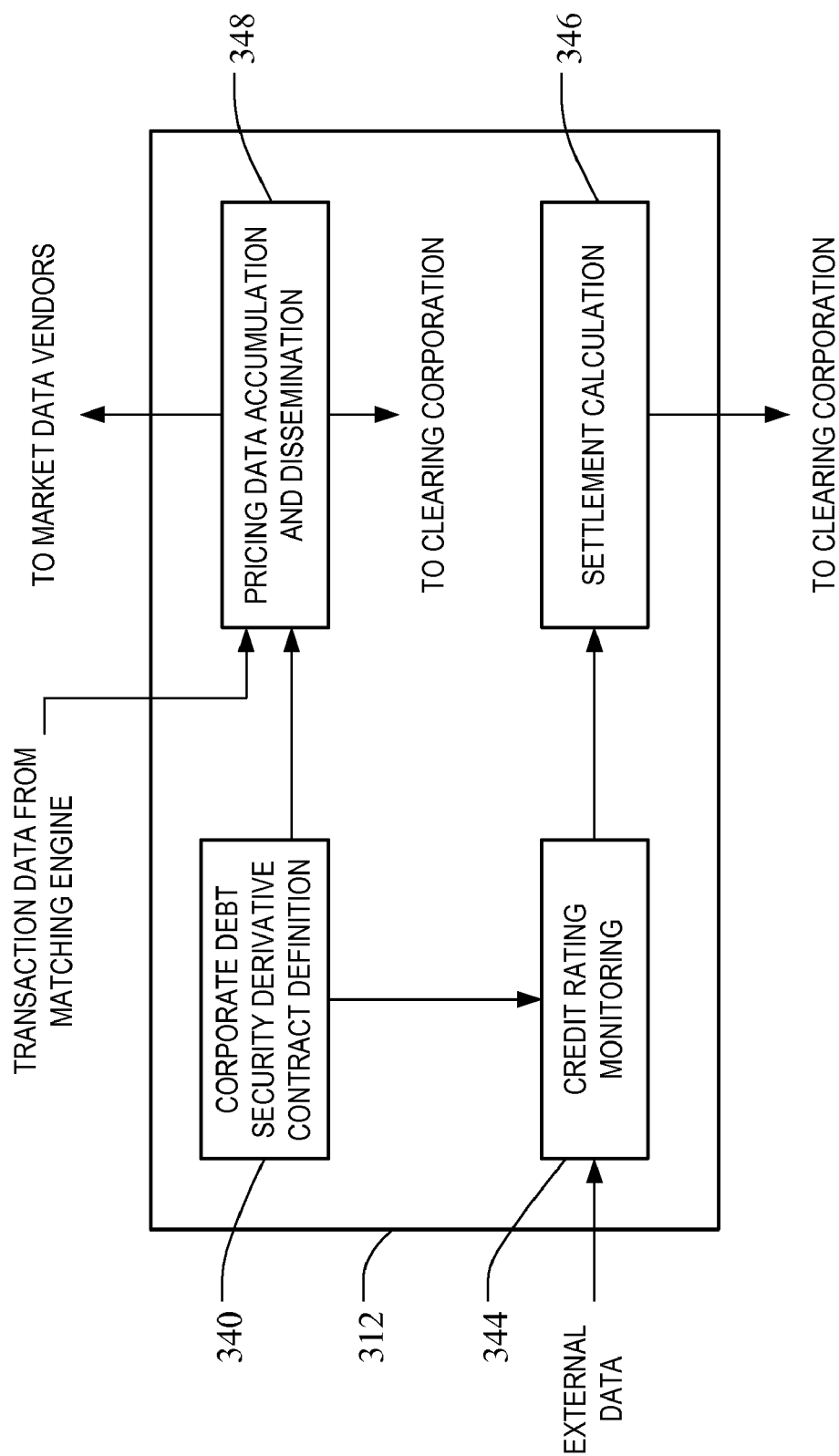
FIG. 4 is a block diagram of backend systems supporting the trading of corporate debt security derivative contracts.

FIG. 4 shows an example of exchange backend systems 312 suitable for trading corporate debt security derivative investment instruments in more detail. A corporate debt security derivative investment instrument definition model definition module 340 stores all relevant data concerning the corporate debt security derivative investment instrument, to be traded on the trading platform 320, including the contract symbol, the identity of the rated entity, the rating service, mapping of the credit risk categories to the monetary values, strike prices futures prices and the like. A pricing data accumulation and dissemination module 348 receives contract information from the corporate debt security derivative investment instrument definition module 340 and transaction data from the matching engine 310. The pricing data accumulation and dissemination module 348 provides the market data regarding open bids and offers and recent transactions to the market data vendors 318. The pricing data accumulation and dissemination module 348 also forwards transaction data to the Clearing Corporation so that the Clearing Corporation may mark-to-market the accounts of Member Firms at the close of each trading day, taking into account current market prices for the corporate debt security derivative investment instruments. Finally, a settlement calculation module 346 receives input from the credit rating service when a corporate debt security derivative investment instrument is settled, the settlement date the settlement calculation module 346 calculates the settlement amount based on the rated entity's present rating and the monetary value to which it is mapped. The settlement calculation module 346 forwards the settlement amount to the Clearing Corporation, which performs a final mark-to-market on the Member Firms' accounts to settle the corporate debt security derivative investment instrument.

According to another embodiment, chooser options may be created based on corporate debt security options. A chooser option is an option wherein the purchaser of the option buys a call or a put option at some time in the future. The call and the put option will typically share the same expiration date and the same strike price (value), although, split chooser options may be crafted wherein the call and the put options have different expirations and/or different strikes.

Chooser options are advantageous in situations in which investors believe that the price of the underlying asset is due for a significant move, but the direction of the move is in doubt. For example, some event, such as the approval (disapproval) of a new product, a new earnings report, or the like, may be anticipated such that positive news is likely to cause the share price to rise, and negative news will cause the share price to fall. The ability to choose whether an option will be a put or a call having knowledge of the outcome of such an event is a distinct advantage to an investor.

The purchase of a chooser option is akin to purchasing both a put and a call option on the same underlying asset. Typically, the chooser option is priced accordingly. In the present case, purchasing a corporate debt security chooser option amounts to buying both a put and a call option based on the credit rating of a rated entity. Chooser options may be traded on an exchange just like other corporate debt security derivative investment instruments. The only accommodations necessary for adapting an exchange for trading chooser options is that a final date for making the choice between a call option and a put option must be established and maintained. Also, post-trade processing on the exchange's systems must be updated to implement and track the choice of the call or a put once the choice has been made. One approach for processing the chosen leg of a chooser option is to convert the chooser option into a standard option contract according to the standard series for the same underlying asset and having the same strike price as the chosen leg of the chooser option.

Figure 5:
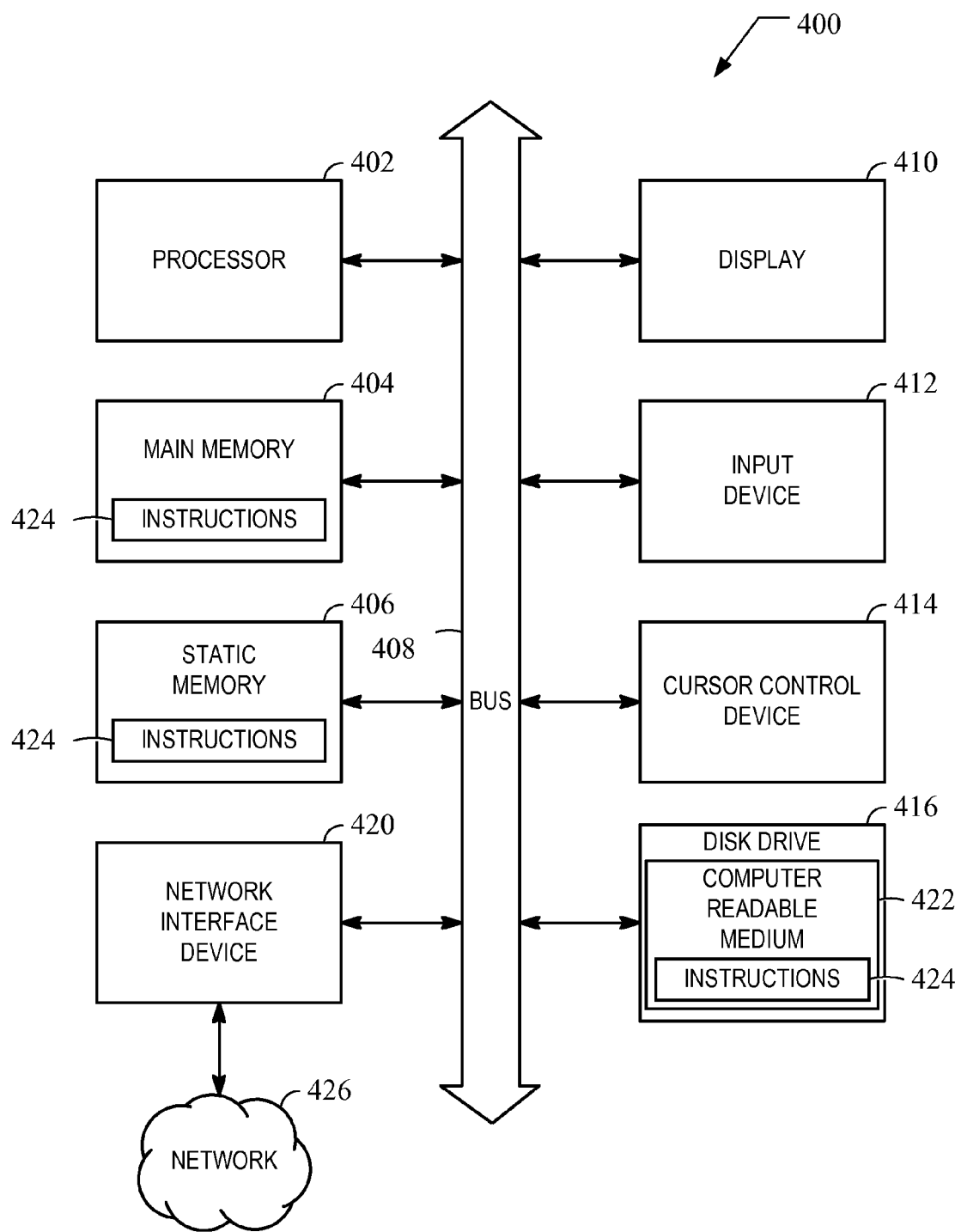
FIG. 5 is a block diagram of a general computing device and network connectivity.

Referring now to FIG. 5, an illustrative embodiment of a general computer system that may be used for one or more of the steps and/or components shown in FIGS. 2 through 4, or in any other trading system configured to carry out the methods discussed above, is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box, a personal digital assistant (PDA), a mobile device, a palmtop computer, a laptop computer, a desktop computer, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 5, the computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416 and a network interface device 420.

In a particular embodiment, as depicted in FIG. 5, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used on financial exchanges, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The method of creating and trading corporate debt security derivative investment instruments and the system for trading such instruments provides investors with a vehicle for taking position relative to changes in various organizations' credit ratings. The ability to take positions regarding organization's credit ratings provides investors with additional tools for managing and diversifying investment risks.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A computer executable method of creating and trading derivative investment instruments based on a corporate debt security, the method comprising:
   identifying a credit rating service having a credit rating scheme that includes a plurality of risk categories using a corporate debt security derivative definition module on an exchange processor, wherein the credit rating service rates an entity's credit worthiness by associating an appropriate one of said plurality of risk categories with the entity;
   the processor mapping the risk categories to unique prices;
   the processor identifying a particular entity which is rated by the credit rating service;
   creating a corporate debt security derivative investment instrument with the processor, wherein a value of the corporate debt security derivative investment instrument is determined at least in part by the unique price to which the risk category associated with the particular entity is mapped;
   transmitting pricing information with a pricing data accumulation and dissemination module on the processor to create a market for the corporate debt security derivative investment instrument; and
   determining, with a settlement module on the processor, appropriate settlement amounts for an executed trade of the corporate debt security derivative investment instrument based on information received at the processor from the credit rating service, wherein the settlement amounts are transmitted to a clearing entity.

2. The method according to claim 1, wherein the corporate debt security derivative investment instrument comprises a corporate debt security call option.

3. The method according to claim 1 wherein the corporate debt security derivative investment instrument comprises a corporate debt security put option.

4. The method according to claim 1 wherein the credit rating service comprises one of: Moody's Investor Services; Standard and Poor's; or Fitch's ratings.

5. The method according to claim 1 wherein transmitting pricing information further comprising listing the corporate debt security derivative investment instrument on an exchange.

6. The method according to claim 5 further comprising accepting orders from investors to take positions in corporate debt security derivative investment instruments, and executing orders by matching corresponding orders to take opposite sides in corporate debt security derivative investment instruments.

7. A system for creating and trading corporate bond security derivative investment instruments on an exchange comprising:
   a processor having a corporate bond security derivative definition module for defining a corporate bond security derivative investment instrument, wherein the corporate bond security derivative definition module is configured to generate a corporate bond security derivative investment instrument by identifying a credit rating service that rates the entity's credit worthiness by associating an appropriate one of said plurality of risk categories with the entity, mapping the risk categories to unique prices and determining a value for the corporate bond security derivative at least in part by the unique price to which the risk category associated with the entity is mapped;
   the processor having a pricing data accumulation and dissemination module for receiving price data based on executed trades of said corporate bond security derivative investment instruments, and disseminating said pricing data to investors, wherein the corporate bond security derivative investment instrument is made publicly available for trading on an exchange to create a market for the corporate bond security derivative investment instrument;
   the processor further having a credit rating monitoring module for monitoring the credit rating of an entity; and
   a settlement calculation module on the processor in communication with the credit rating monitoring module for calculating a settlement amount based at least in part on a unique price to which the current credit rating of the entity is mapped.

* * * * *